Jan. 8, 1935.                P. A. BORDEN                1,987,177
                    ELECTRICAL MEASURING INSTRUMENT
                         Filed Jan. 2, 1934
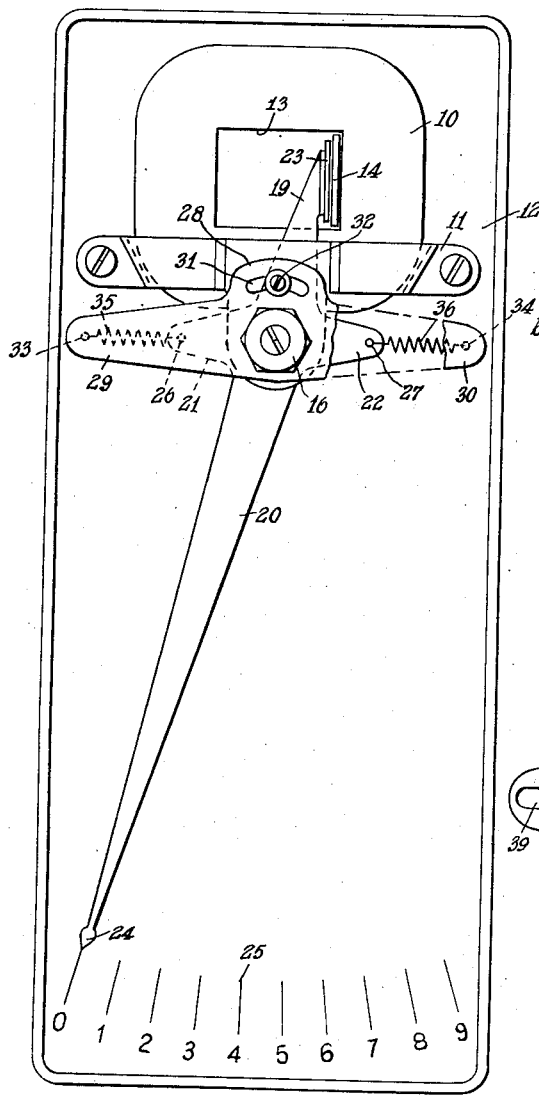
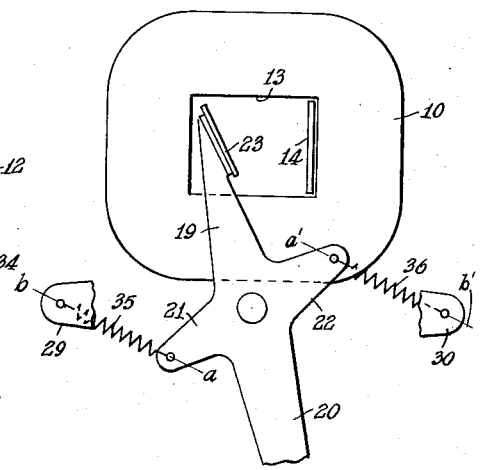
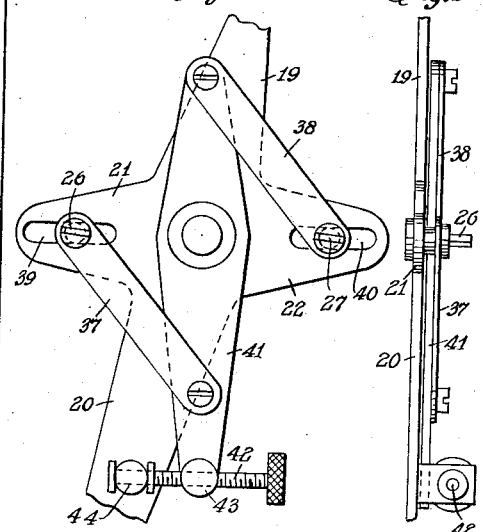
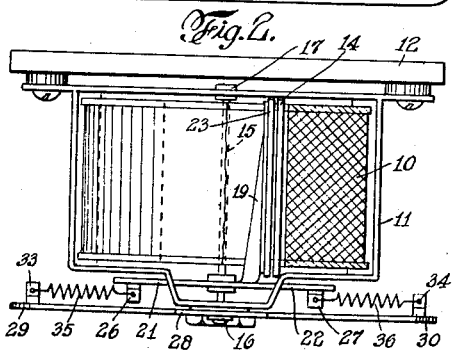
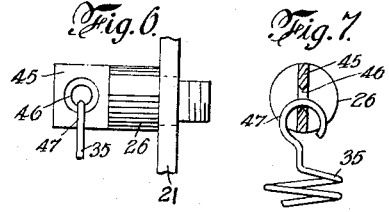
INVENTOR
PERRY A. BORDEN
BY
ATTORNEY Patented Jan. 8, 1935

1,987,177

UNITED STATES PATENT OFFICE 1,987,177

ELECTRICAL MEASURING INSTRUMENT

Perry A. Borden, Waterbury, Conn., assignor to The Bristol Company, Waterbury, Conn., a corporation of Connecticut Application January 2, 1934, Serial No. 704,869

8 Claims. (Cl. 171—95)

This invention relates to electrical measuring instruments, and more particularly to instruments of the so-called "repulsion" type, in which the actuating force is derived from the mutual repulsion of similarly magnetized pieces of ferrous material located in a magnetic field common to both and produced by the electrical current under measurement. In the design of such instruments it has heretofore been the practice so to mount the moving element that its axis of rotation will lie wholly within the field-producing solenoid, generally on or near its center line. While this makes for a large angle of deflection, generally a desirable feature in indicating instruments, it defeats the purpose of recording instruments, where it is desirable as a rule that the angle of deflection be small in order that the path of the pen or stylus on the chart approach closely to the ideal of a straight line. Moreover, when a part of the space within the coil is occupied by the shaft and radial supports of the moving element actuated thereby, it follows that the electromagnetic properties of the space cannot be fully utilized, with a consequent loss of efficiency in the application of the materials of the electromagnetic system.

The present invention has for an object the provision of a repulsion type of measuring element wherein the axis of the moving part is positioned wholly exteriorly to the field producing coil, permitting a smaller angle of deflection, and also allowing the moving vane to traverse substantially the whole internal open section of said coil, so that a most efficient use is made of the electromagnetic system.

In electrical measuring instruments of the moving iron element type, since the magnetic fluxes produced in both the stationary and moving elements vary with the magnitude of current flowing in the windings, there is a tendency for the deflection of the moving element to vary as the square of the measured magnitude, the calibration markings in their relative spacing thus being caused to approach a quadratic law. A scale of this nature, having small divisions near its lower limit and abnormally large divisions near its upper limit, is seldom desirable; and it is a further object of the present invention to modify such quadratic characteristic and to secure a scale in which a certain degree of uniformity exists throughout the range. It is well understood that, in a spiral spring of the conventional type, the deflection varies substantially as the torque (or vice versa) so that by the use of such a spring there would be introduced no tendency to offset a quadratic characteristic; and the invention has for a still further object the provision of a control system in which helical springs may be utilized in a geometric system for attaining the desired compensation.

In carrying out the invention, a stationary core or magnetizable plate is mounted within the central opening of a coil which is adapted to carry current whose magnitude is to be determined, and a movable magnetizable member is mounted for angular displacement in said opening in juxtaposition to the said core. The said movable member, furthermore, is so mounted that its axis of rotation lies wholly without the said opening and so that it may traverse substantially the whole space within the coil. Suitable resilient means attached to the movable member control its deflection when the coil is energized.

The nature of the invention, however, will best be understood when described in connection with the accompanying drawing, in which:

Fig. 1 is a front elevation of the novel electrical instrument embodying the invention, a portion being broken away to disclose the disposition of certain parts.

Fig. 2 is a top view of the measuring element, partly in section.

Fig. 3 is a fragmentary front elevation, showing the relative position of certain parts when under deflection.

Fig. 4 is a fragmentary elevation on an enlarged scale of the means for providing certain adjustments.

Fig. 5 is a side view thereof.

Fig. 6 is a top view of a spring-attachment stud utilized in the instrument.

Fig. 7 is an end view of the same, partly in section.

Referring to the drawing, 10 designates a coil of insulated wire adapted to receive the current under measurement, and carried upon a supporting member 11 which is secured in turn to a base-plate 12. Through the coil is a rectangular opening 13; and within this opening and secured at one side thereof with its principal axis disposed parallel to that of the coil is a stationary core or magnetizable plate 14 made up of laminations of highly magnetizable material. A shaft or spindle 15, pivoted in bearings 16 and 17 toward the front and rear portions respectively of the supporting member, passes immediately beneath the coil 10.

There is secured to this shaft a spider forming the foundation of the moving element, and having four principal arms 19, 20, 21 and 22. The upper arm 19 is extended to form a bracket which passes within the opening 13 and carries a vane or armature 23 made up of laminations having material, structure and dimensions similar to those of the magnetizable plate 14. With angular movement of the spider about the center line of the shaft 15 the vane 23 is free to move transversely in the opening 13 from the position it is shown as occupying in Fig. 1 to that shown in Fig. 3.

The lower arm 20 of the spider is extended to form an indicating pointer 24, which by its excursion over a graduated scale 25, provides an indication of the angular position of the said spider and parts borne thereby. It is evident that the pointer 24 may be replaced by a pen or stylus (not shown), adapted to traverse a graduated chart (not shown) and thus provide a graphic record of instantaneous positions of the moving element.

The transverse arms 21 and 22 are extended diametrically opposite each other, and are so disposed with regard to the arm 19 that when the vane 23 is moved to a position immediately adjacent the plate 14 they will lie in a substantially horizontal position, as shown in Fig. 1. Carried by the said transverse arms 21 and 22 are spring-attachment studs 26 and 27 respectively, the details of whose construction and mounting will be set forth hereinafter.

Adjustably secured to the supporting member 11, and angularly movable on the bearing 16, is an abutment member 28 having oppositely extending arms 29 and 30. An arcuate slot 31 is also provided in the member 28 through which may pass a clamping screw 32 threaded into the supporting member 11, so that the angle through which the member 28 may be rotated is limited by said slot, and the operating position of said abutment member may be fixed by the clamping action of screw 32.

Carried by the arms 29 and 30 are spring-attachment studs 33 and 34, respectively, which are diametrically opposed to each other and lie in the plane of rotation of the studs 26 and 27, so that when the vane 23 is in juxtaposition to its plate 14, the four studs 26, 27, 33 and 34, and the point of intersection of the center line of the spindle 15 with said plane will lie in the one straight line. Between the studs 26 and 33 is extended the tension spring 35, and between the studs 27 and 34, the similar spring 36, these springs coacting in opposition to maintain normally the aforementioned straight-line relationship. The two springs are made to have substantially equal strengths, so that by their opposing action they will neutralize side thrust on the bearing 16.

The operation of the device in its essential form, as thus far set forth is as follows:

With no current flowing in the coil 10, no magnetic field will be present and no flux will be induced in the vane 23 and the plate 14. The moving element will then be subject only to the joint action of the springs 35 and 36, urging their points of attachment into one straight line and maintaining the vane 23 in a position immediately adjacent to the plate 14, with the pointer 24 located at its zero indication on the scale.

Upon current being caused to pass through the coil 10, a field will be set up in the opening 13, and the plate 14 and vane 23 magnetized in a sense to have their similar poles mutually adjacent. Thus, there will be set up a condition of repulsion between the plate 14 and the movable vane 23, with the result that the latter will tend to recede from the former and will follow a transverse arcuate path within the opening 13 as constrained by the rotation of the spider with the spindle 15. As the moving element is deflected from its zero position, the supporting studs 26 and 27 will follow arcuate paths, increasing their distances from the corresponding studs 33 and 34, respectively, and extending the springs 35 and 36 accordingly.

At the same time, as the points of attachment of the moving ends of the springs follow the arcuate paths described by the studs 26 and 27, the springs no longer act along a line passing through the center of rotation, but along lines as $a$—$b$ and $a'$—$b'$ (Fig. 3) thus producing a restoring moment proportional not only to the linear distortion of the springs but to the divergence of the lines $a$—$b$ and $a'$—$b'$ from the line $b$—$b'$, as measured along the perpendicular $a$—$a'$, passing through the center of rotation. Thus it will be seen that the restoring moment, tending to oppose rotation of the moving element of the instrument, will vary, through the angle of rotation, according to a magnitude greater than the first power of the linear distortion of the springs. As the mechanical reaction exerted between a magnetic field and a magnetizable body placed therein tends to vary according to the second power of the field strength, it will be seen that by proper proportioning and adjustment of the elements of the structure, it will be possible to make the characteristic law of the control system approach closely to that of the magnetic system, so that the angular deflection of the moving element will be substantially proportional to the magnitude of the current flowing in the coil 10, and equal increments of current in the coil will be represented by substantially equal increments on the scale 25.

Adjustment of the neutral or "zero" position of the moving element may be effected initially by varying the angular position of the abutment member 28, as permitted by the slot 31, after which the adjustment may be made permanent by clamping the screw 32. In order to adjust the intensity of action of the control springs, the following expedient may be resorted to: The studs 26 and 27, instead of being permanently affixed to the arms 21 and 22, are attached to one end each of respective links 37 and 38 (Figs. 4 and 5) and are constrained to move in slots 39 and 40 provided radially in the arms 21 and 22.

In addition, a rocker-arm 41, carried upon the spider and pivoted about its center of rotation, has pivoted thereto at vertically disposed opposite points the free ends of the links 37 and 38, so that as the rocker-arm is moved through a limited angle about its center of rotation, the said links cause the studs to slide in the slots 39 and 40. A screw 42, threaded through a swivel post 43 on an extended lower portion of the rocker-arm 41, and journaled in a swivel post 44 on the arm 20, serves as a micrometer adjustment for the said rocker-arm so that, as the screw 42 is turned, the studs 26 and 27 will slide in the slots 39 and 40, serving to vary both the effective radius of action of the springs to be carried by the respective studs and their change of length for a unit deflection of the moving element. There will thereby be provided an adjustment of the deflection of the pointer or pen, as related to the magnitude of current flowing in the coil 10.

Frictionless action of the springs is effected by the provision of knife-edge supports, as illustrated in Figs. 6 and 7, where the bearing of the spring 35 upon the stud 26 is shown as typical of the method of attachment. A portion of the stud is made of a flat thin section, as at 45, and through this portion is formed a circular opening 46 countersunk from both sides, thus providing a circular knife-edge. The eye of the spring is formed into a ring as at 47, or bent to an angle materially greater than that made by the knife-edges. Thus, a point or line contact is always provided between the spring and the stud; and, whatever the angular position of the spring relative to the stud, within the limits of operation, the line contact is maintained, thus eliminating sliding or rolling friction in this part of the movement.

I claim:

1. In an electrical measuring instrument of the repulsion type, a coil adapted to carry current whose magnitude is to be determined and having therein a central opening, a stationary plate of magnetic material occupying a relatively small part of the central opening, and a movable member adapted for rotation about an axis located exterior to the coil parallel to its magnetic axis and having an armature of magnetic material located substantially entirely within the central opening and normally in juxtaposition to the stationary plate, said armature adapted to move within the coil from a position adjacent the said stationary plate to a position remote therefrom under the influence of magnetic reaction between said plate and said armature, the latter in its movement between extreme positions to traverse substantially the whole space within the coil.

2. In an electrical measuring instrument of the repulsion type, a coil adapted to carry current whose magnitude is to be determined and having therein a central opening, a stationary plate of magnetic material occupying a relatively small part of the central opening, a movable member adapted for rotation about an axis located exterior to the coil parallel to its magnetic axis and having an armature of magnetic material located substantially entirely within the central opening and normally in juxtaposition to the stationary plate, said armature adapted to move within the coil from a position adjacent the said stationary plate to a position remote therefrom under the influence of magnetic reaction between said plate and said armature, the latter in its movement between extreme positions to traverse substantially the whole space within the coil, and spring means for controlling the deflection of said movable member.

3. In an electrical measuring instrument of the type having a coil adapted to carry current whose magnitude is to be determined, and having therein a central opening, a stationary plate and a movable armature both of magnetic material and both occupying a relatively small part of the interior space of said coil, a spindle and a movable mounting for said armature, said spindle being exterior to the coil and substantially parallel to its magnetic axis, and adapted to permit said armature to traverse substantially the whole free space within said coil, a pair of supports oppositely and radially disposed on the movable mounting, a stationary mounting, a pair of supports oppositely and radially disposed thereon, a pair of springs tensioned each between one of said movable supports and one of said stationary supports, the four supports normally lying in a straight line passing through the axis of said spindle, and said springs being subject to deviation from said line when said movable mounting is deflected from its normal position.

4. In an electrical measuring instrument of the type having a coil adapted to carry current whose magnitude is to be determined, and having therein a central opening, a stationary plate and a movable armature both of magnetic material and both occupying a relatively small part of the interior space of said coil, a spindle and a movable mounting for said armature, said spindle being exterior to the coil and substantially parallel to its magnetic axis, and adapted to permit said armature to traverse substantially the whole free space within said coil, a pair of supports oppositely and radially disposed on the movable mounting, an adjustable stationary mounting, a pair of supports oppositely and radially disposed thereon, a pair of springs tensioned each between one of said movable supports and one of said stationary supports, the four supports normally lying in a straight line passing through the axis of said spindle, and said springs being subject to deviation from said line when said movable mounting is deflected from its normal position.

5. In a measuring instrument having a stationary element, a movable element, the latter being adapted to rotate about an axis, a pair of knife-edge supports oppositely and radially disposed on the movable element, a pair of knife-edge supports oppositely and radially disposed on the stationary element, and springs, each connecting one of the former supports to one of the latter supports, so that the movable element, under the influence of the springs, may take up a position wherein the several supports and the axis of rotation are in a single straight line.

6. In an electrical measuring instrument, the combination of a stationary magnetizable member, a movable magnetizable member, the latter being rotatable about an axis and under the influence of magnetic forces between said magnetizable members, a fixed support, a support movable with the moving member, a tension control-spring having its one extremity attached to the fixed support and its other extremity to the support movable with the moving member, and about a predetermined radius, and means for adjusting the effective length of said radius.

7. In an electrical measuring instrument, the combination of a stationary magnetizable member, a movable magnetizable member, the latter being rotatable about an axis and under the influence of magnetic forces between said members, a normally fixed support, a support movable with the moving member, a tension control-spring having its one extremity attached to the normally fixed support and its other extremity to the support movable with said moving member and at a predetermined radius, means for adjusting the angular position of said normally fixed support, and further means for adjusting the effective length of said radius.

8. In a measuring instrument of the class having a stationary element and an element movable relatively thereto under the influence of a force developed by a condition to be measured, oppositely disposed tension springs for balancing said force and tending to take up a position wherein said springs lie in a single straight line, and supports for said springs, each including a relatively thin section having therein an opening countersunk to a sharp edge whereby is provided a curved knife-edge bearing, and each of said springs having its extremities conformed to engage said knife edges with freedom for angular movement.

PERRY A. BORDEN.